(12) United States Patent
Tan et al.

(10) Patent No.: US 6,430,776 B1
(45) Date of Patent: Aug. 13, 2002

(54) HINGE MECHANISM

(75) Inventors: Yeow Paul Tan; Shyh Lai Long; Kwok Nan Philip Loh, all of Singapore (SG)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/650,221

(22) Filed: Aug. 29, 2000

(30) Foreign Application Priority Data

Mar. 24, 2000 (SG) ........................................ 200001733-5

(51) Int. Cl.⁷ ............................................... E05D 11/10
(52) U.S. Cl. ............................ 16/325; 16/242; 16/357; 16/361; 16/342
(58) Field of Search ..................... 16/325, 341, 342, 16/357, 360, 361, 350, 374, 242; 220/283, 315, 832, 836, 840, 841; 361/680, 681, 728, 729; 248/676, 677

(56) References Cited

U.S. PATENT DOCUMENTS

| | | | | |
|---|---|---|---|---|
| 824,578 A | * | 6/1906 | Patten | 16/361 |
| 1,466,039 A | * | 8/1923 | Burcsak | 16/361 |
| 2,197,481 A | * | 4/1940 | Nyden | 16/360 |
| 2,692,055 A | * | 10/1954 | Feiertag | 16/361 |
| 2,777,156 A | * | 1/1957 | Weisgarber | 16/361 |
| 5,048,715 A | * | 9/1991 | Wolff | 220/832 |
| 5,121,521 A | * | 6/1992 | Hagiwara et al. | 16/354 |
| 5,337,911 A | * | 8/1994 | Holub | 16/383 |

* cited by examiner

*Primary Examiner*—Chuck Y. Mah

(57) ABSTRACT

A low cost and long lasting hinge mechanism suitable for hinging a cover to a housing of a device is disclosed. The hinge mechanism has a pair of pins attached to the cover and a corresponding pair of apertures on the housing. The pins fit into the apertures to hinge the cover to the housing to allow the cover to be tilted from a closed position to an open position. The aperture has a first portion and a second constricted portion. A pivoting point is provided on a tab on the housing. A corresponding cam-profiled section is provided on the cover for interacting with the pivoting point to urge the pin into the corresponding constricted portion of the aperture for securing the cover in the open position.

11 Claims, 3 Drawing Sheets

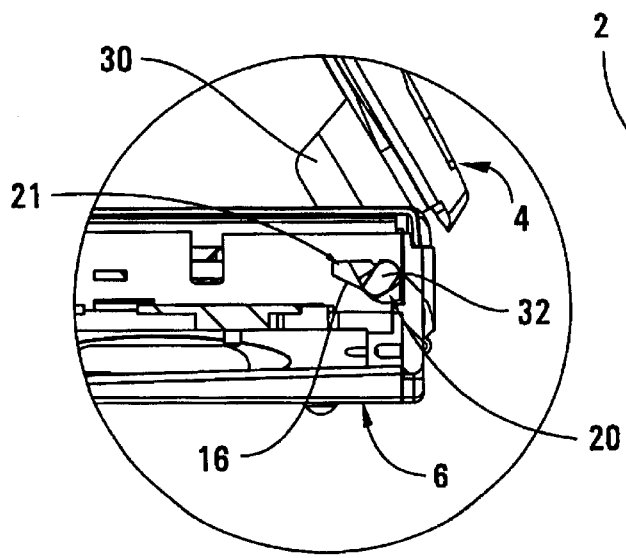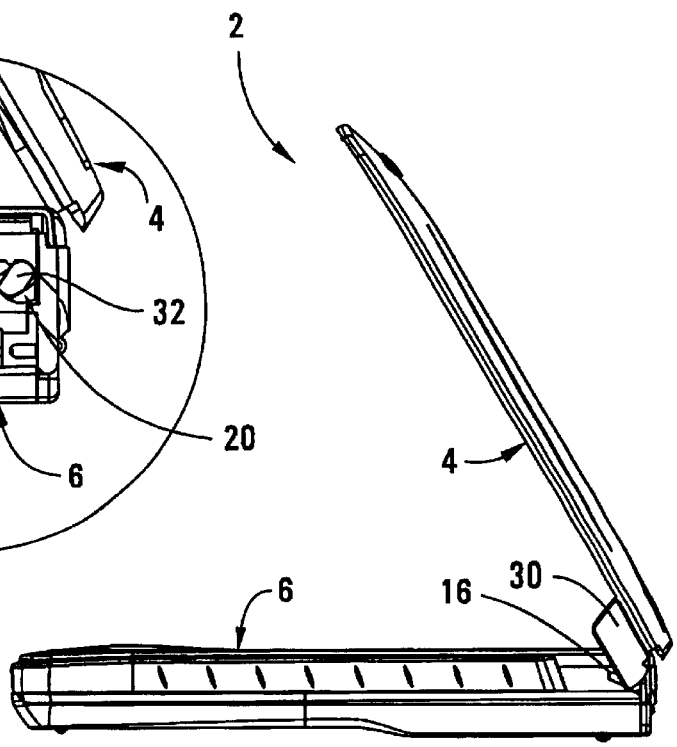
*Figure 3B*
*Figure 3A*
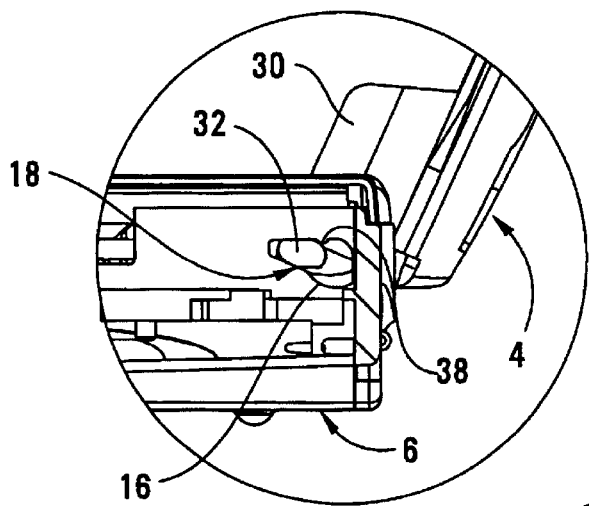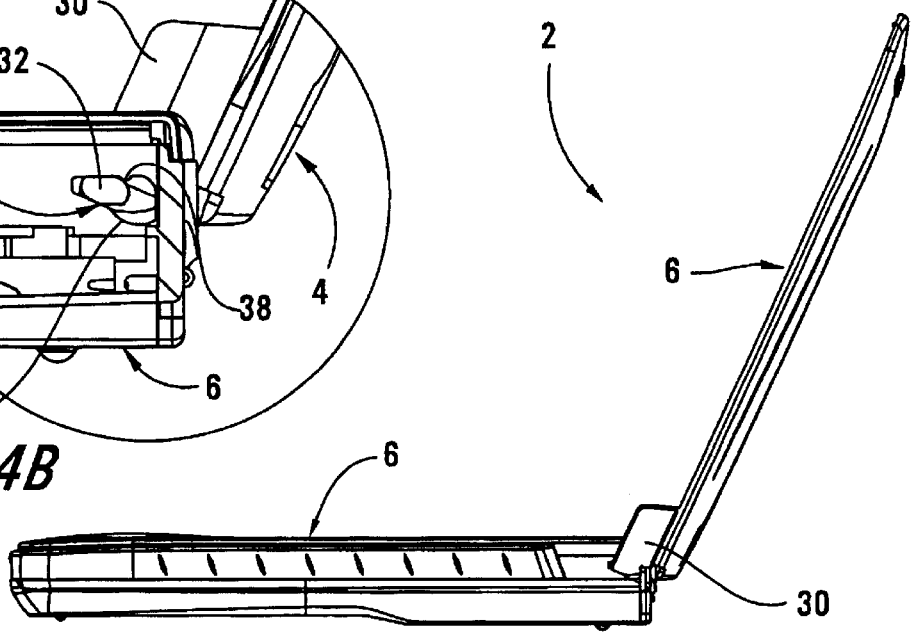
*Figure 4B*
*Figure 4A*

HINGE MECHANISM

FIELD OF INVENTION

This invention relates to a hinge mechanism. More particularly, this invention relates to a hinge mechanism for hinging a cover to a housing. The cover can be tilted between a closed and an open position in relation to the housing. In the open position, the cover is securely held in place.

BACKGROUND

In the prior art, a cover for a device such as a palm-sized personal computer (P/PC) or personal digital assistant (PDA) is generally attached to a housing of the device using a simple pin and socket hinge. In such a device, the cover has a panel for either partially or fully covering a surface of the housing to protect a display on the surface or to protect the device against inadvertent activation. The panel of the cover has two pins arranged along a pivoting axis. These pins are usually round in cross section. Corresponding to these pins on the cover are apertures on the housing. When assembled, the pins on the cover are fitted into these corresponding apertures in the housing. Such an assembly allows the cover to be hinged to and tilted about the housing. The cover tilts about the pivoting axis of the pins to an open and a closed position.

In the closed position, the panel is juxtaposed to a housing surface to cover the surface. In the open position, the cover is tilted away from the surface to allow access to control buttons and the display. The cover is normally held in the open position by a simple detent on the device. This detent includes a bump of the cover and a corresponding dimple on the housing. In the open position, the bump sits snugly in the dimple to prevent the cover from tilting back to the closed position.

Such a hinge mechanism including the bump and dimple works but is prone to wear. Through frequent use, the bump on the cover wears down and does not engage well with the dimple to hold the cover in place. Such poor engagement will result in the cover being easily dislodged when in the open position. The cover will then have the tendency to tilt back towards the closed position when the device is subjected to rough use.

From the foregoing, the prior art therefore has a need for a low-cost and longer lasting hinge mechanism that is able to continue to function after prolonged usage. This hinge should also allow the hinged parts to be held apart in an open position substantially securely to prevent the two parts from being easily dislodged from the open position. This hinge should also preferably provide a user with a tactile feel that the open position is reached when tilting one part about the other.

SUMMARY

In accordance with a preferred embodiment, a hinge mechanism suitable for hinging a first part of a device to a second part of the device has a pair of pins attached to the first part and a pair of guides on the second part. The pair of guides receives the pins to allow the first part to hinge to the second part. The first part can be tilted from a closed position to an open position in relation to the second part. Each guide defines a first guide portion and a second guide portion within the confines of the guide. A pivoting point is provided on either the first or the second part of the device. A corresponding cam-profiled section is provided on the other part for interacting with the pivoting point to urge the pin into the corresponding second guide portion for securing the first part in the open position when the first part is tilted from the closed position to the open position.

Preferably, the cam-profiled section includes a notch that latches onto the pivoting point to prevent the parts from being dislodged when in the open position.

Also, preferably each pin has a flattened cross-section that has a narrow and a wide dimension. The second guide portion is also constricted to receive the pin by the narrow dimension so that the pin is securely held in the second guide portion when the first part is in the open position.

Preferably, the hinge mechanism further includes at least one bump along the periphery within the confines of the guide between the first and the second portions of the guide. This bump restricts the movement of the pin between the first guide portion and the second guide portion.

BRIEF DESCRIPTION OF DRAWINGS

The invention will be better understood with reference to the following drawing, in which:

FIG. 3A is a side view similar to FIG. 1A with the cover tilted to an intermediate position between the open and a closed position.

FIG. 3B is an enlarged side view similar to FIG. 1B showing the pin in a corresponding intermediate position when the cover is tilted to the intermediate position.

FIG. 4A is a side view similar to FIG. 1A with the cover tilted to an open position.

FIG. 4B is an enlarged side view similar to FIG. 1B showing the pin wedged in position in a portion of the aperture in FIG. 1B.

DETAILED DESCRIPTION OF THE PREFERRED EMBODIMENT

Hereafter, a preferred embodiment of the present invention will be described in the context of a palm-sized personal computer (P/PC) that has a cover hinged to a housing using a hinge mechanim. However, it is to be understood that the invention is equally applicable to other types of devices, casings or parts wherein one part is to be tilted to and held substantially securely in an open position in relation to a second part.

Figure 2B:
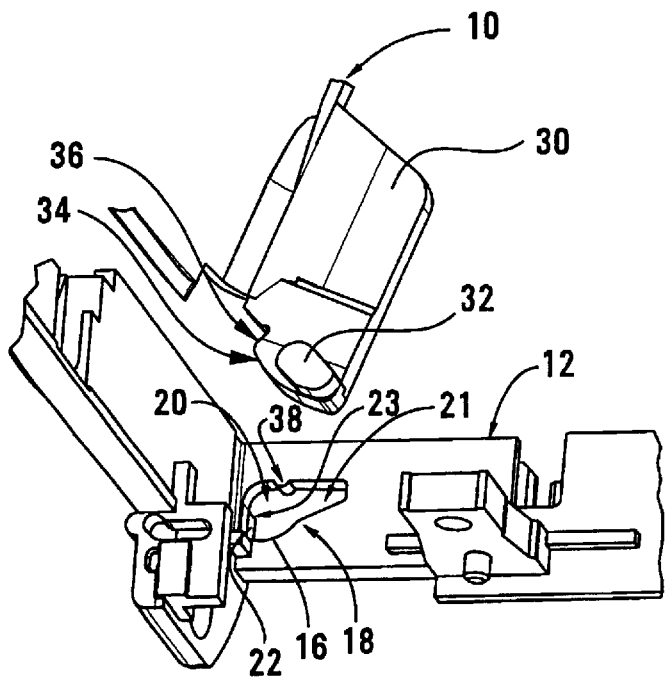
FIG. 2B is an enlarged view showing a portion of the inlay and the frame in FIG. 2A.
Figure 1A:
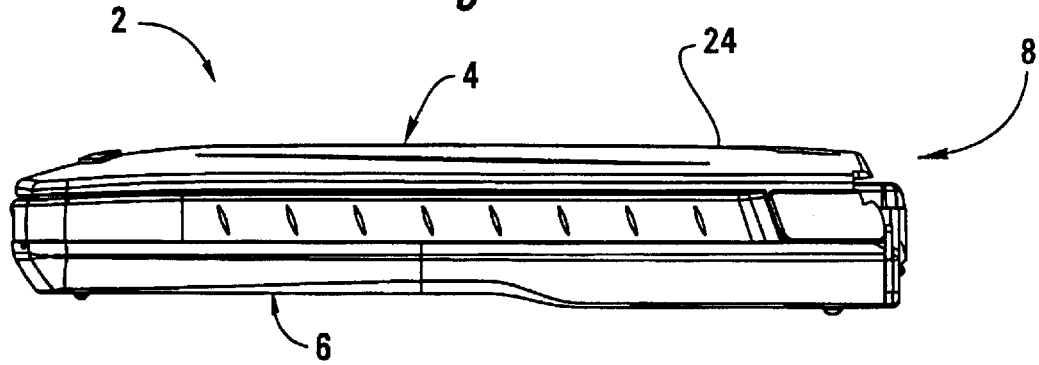
FIG. 1A is a side view of a palm-sized personal computer (P/PC) which has a hinge mechanism according to the present invention. The P/PC has a cover hinged to a housing using the hinge mechanism. The cover is shown in a closed position.
Figure 2A:
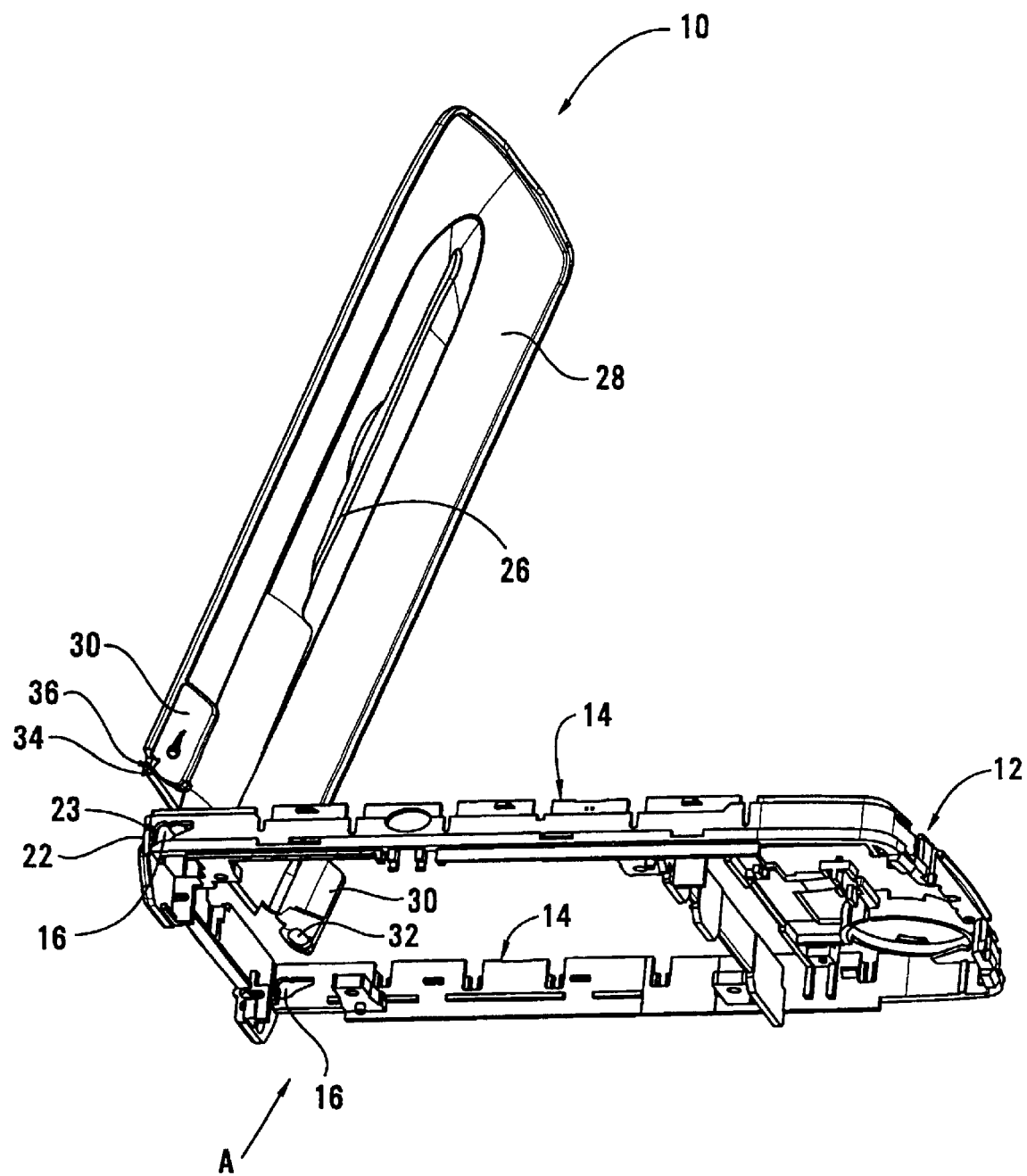
FIG. 2A is an exploded view of an inlay of the cover of FIG. 1A and a frame of the housing in FIG. 1A.

The housing of the P/PC contains a printed circuit board assembly (PCBA), a touch-screen liquid crystal display (LCD) and buttons for activating the P/PC. The cover protects the display and prevents inadvertent activation of the P/PC. The hinge mechanism allows the cover to be tilted to an open position for a user to access the buttons and the touch-screen display. When in the open position, the cover is held substantially securely in this position FIG. 1A is a side view of a P/PC 2 with a cover 4 shown in a closed position in relation to a housing 6 using a hinge mechanism 8 according to the present invention. FIG. 2A is an exploded view of an inlay 10 of the cover 4 and a frame 12 of the housing 6 on which the hinge mechanism 8 is implemented. FIG. 2B is an enlargement of a portion of FIG. 2A indicated by an arrow A. The frame 12 with two sidewalls 14. Apertures 16 are built into these sidewalls 14 for attachment of the cover. The aperture walls have thicknesses of preferably about 1.4 mm. This frame 12 is preferably molded from plastic such as PC.

The apertures 16 on the housing 6 are formed in the frame 12 during molding of the housing 6. A contoured portion 18 along the aperture wall separates each aperture 16 into two portions—a larger portion 20 and a constricted portion 21. This contoured portion 18 introduces a bump in the aperture 16. The frame 12 also has a tab 22 that has a thickness of about 1.5 mm. An edge or side of this tab 22 acts as a pivoting point 23.

The cover 4 is formed by an outer cover 24 and the inlay 10. Such a design of the cover 4 allows the inlay 10 to define a compartment 26 between the inlay 10 and the outer cover 24 to store a stylus (not shown). In this preferred embodiment of the invention, the inlay 10 has a panel 28 with two opposite facing sidewalls 30 depending therefrom. Attached to these sidewalls 30 are oppositely directed pins 32 aligned along a pivoting axis. The pins 32 are preferably of lengths of approximately 1.5 mm. The cover 4 is hinged to the housing 6 by inserting these pins 32 into the corresponding apertures 16 in the housing 6. Such an arrangement allows the cover 4 to be tilted about the housing 6 between a closed and an open position. In the closed position of the cover 4, the pin 32 is located in the larger portion 20 of the aperture 16 and the pin 32 can be rotated therein. In the open position of the cover 4, the pin 32 is at least partially received in the constricted portion 21 of the aperture. In this position, the pin 32 is prevented from freely rotating. As a result, the cover 4 is substantially secured in the open position.

The width of the inlay 10 of the cover 4 is wider than the width of the frame 12 of the housing 6 so that the sidewalls 30 of the inlay 10 is preferably clear of the housing 6 to reduce friction therebetween during use. With such a design, the pins 32 do not protrude the apertures 16 into the area enclosed by the frame 12. This area is then maximized for containing the PCBA and the LCD.

Preferably, each sidewall 30 of the cover 4 has a cam-profiled section 34. This cam-profiled section 34 should preferably have a thickness of about 1.5 mm. Also, a notch 36 is preferably built into the sidewall at one end of this cam-profiled section 34. The pin 32 preferably has a generally flattened cross section that has a wide and a narrow dimension. The sidewalls 30 and pins 32 are integrally molded with the inlay 10, using plastics such as Velox, nylon and PC/ABS.

Figure 1B:
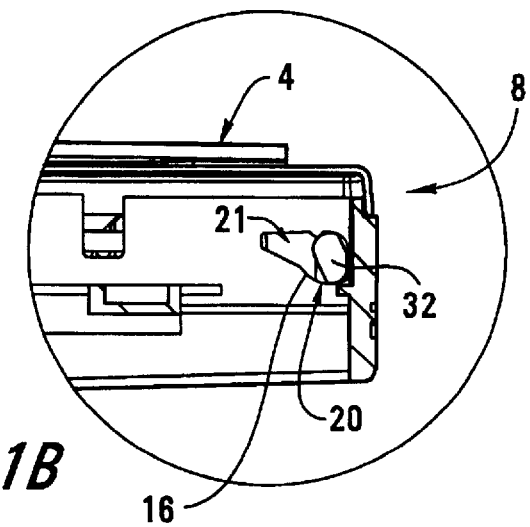
FIG. 1B is an enlarged side view of a pin and an aperture of the hinge mechanism of FIG. 1A.

The operation of the hinge mechanism 8 is next described in detail. In the closed position of the cover 4 as shown in FIG. 1B, the pin 32 is located in the larger aperture portion 20 of the housing. As the cover is tilted away from this closed position towards the open position, the pin 32 rotates within the confines of the larger aperture portion 20 to allow the cover 4 to swing away from the housing 6. As the cover 4 swings open, it will come into an intermediate position where the cam-profiled section 34 of the sidewall comes into contact with the pivoting point 23 of the tab 22 on the housing 6. If the cover 4 is tilted beyond this intermediate position, the cam-profiled section 34 will interact with the pivoting point 23 to urge the pin 32 towards the constricted aperture portion 21. FIG. 3A is a side view showing the cover tilted to this intermediate position where the angle between the cover 4 and the housing 6 is about 60 degrees. FIG. 3B is an enlarged side view that shows the pin 32 position in the aperture 16 when the cover 4 is in the intermediate position. When in this position, the pivot point 23 impedes the further tilting of the cover 4 towards the open position. A slightly larger force is required to overcome the inertia of the pivoting point 23 on the cam-profiled section 34 to tilt the cover 4 further towards the open position.

Also when in the intermediate position, the pin 32 on the cover 4 comes into contact with the aperture wall that defines the contoured aperture portion 18 to further impede the tilting of the cover 4. The larger force that is required to tilt the cover beyond the intermediate position will also need to overcome the inertia of the pin 32 against the contoured aperture portion. When a user applies such a force, the cover will tilt beyond the intermediate position to allow the pin 32 to move towards the constricted aperture portion 21. This movement of the pin 32 is along a horizontal axis and covers a distance of approximately 2 mm. Such a small movement in the horizontal direction is hardly noticeable by the user. When the pin 32 clears the contoured aperture portion, the user is however able to get a tactile feel that the open position is reached. FIG. 4A is a side view that shows the cover tilted to the open position where the angle between the cover 4 and the housing 6 is about 115 degrees. FIG. 4B is an enlarged side view which shows the pin held or wedged in the constricted aperture portion 21. Further tilting of the cover will result in the pin 32 being pushed against the constricted aperture portion 21 as shown in FIG. 4B. In this position, the notch 36 on the cover sidewall 30 also latches onto the pivoting point 23 on the tab 22. This wedging action of the pin 32 in the constricted aperture portion 21 and the latching of the notch 36 on the pivoting point 23 are sufficient to hold the cover 4 in place. Another smaller contoured portion 38 in the aperture 16 positioned across from the first contoured portion 18 can be provided to further secure the pin 32 in the constricted aperture portion 21.

Although there are larger areas of contact between moving parts in the hinge mechanism 8, wear caused by abrasion between these moving parts is reduced by the design of the cam-profiled surface 34, tab 22, pin 32 and aperture 16 wall. The length of the pins and the thickness of the aperture walls are designed to be sufficiently large to withstand wear. The dimensions of the cam-profiled section 34 and the tab 22 can be similarly designed to withstand wear. Overall, this design results in a hinge mechanism that is more resistant to wear and is therefore able to last longer.

While the present invention has been shown and described with reference to the foregoing operational principles and preferred embodiment, it will be apparent to those skilled in the art that other changes in form and detail may be made. For example, some of the features of the preferred embodiment can be removed without adversely affecting the operation of the hinge mechanism. An example of which is the notch 36. The notch can be removed and the hinge mechanism 8 will still work albeit not as ideally. Likewise, the two contoured portions 18, 38 in the aperture 16 can also be removed.

In the preferred embodiment, the aperture 16 is built into the housing 6 and the pin 32 attached to the cover 4. An embodiment with the aperture built into the cover and the pin attached to the housing would also work. The apertures can also be replaced by appropriately contoured and raised tabs to guide the movement of the pins.

We claim:

1. A hinge mechanism suitable for hinging a first part of a device to a second part of the device wherein the first part can be tilted between an open position and a closed position in relation to the second part, the hinge mechanism comprising:

a pair of pins attached to the first part and arranged along a pivoting axis;

a pair of guides on the second part of the device for receiving the pins to hinge the first part to the second part, wherein each guide defines a first guide portion and a second guide portion within the confines of the guide;

a pivoting point along the confines of the guide, on one of the first and the second part of the device; and a cam-profiled section on the other of the first part and the second part for interacting with the pivoting point to urge the pin into the second guide portion for securing the first part in the open position when the first part is tilted from the closed position to the open position.

2. A hinge mechanism according to claim 1, wherein the cam-profiled section further includes a notch that latches onto the pivoting point to prevent the first part from being dislodged when in the open position.

3. A hinge mechanism according to claim 1, wherein each pin has a flattened cross-section having a narrow and a wide dimension and wherein the second guide portion is constricted to receive the pin by the narrow dimension of the pin so that the pin is held in the second guide portion when the first is in the open position.

4. A hinge mechanism according to claim 1, further including at least one bump along the periphery within the confines of the guide between the first and the second portions of the guide to restrict pin movement of the pin between the first guide portion and the second guide portion.

5. A hinge mechanism according to claim 1, wherein the second part includes a pair of apertures wherein aperture walls define the pair of guides.

6. A hinge mechanism according to claim 1, wherein the pin is integrally formed with the first part and an aperture is integrally formed in the second part.

7. A hinge mechanism according to claim 1, wherein the first part is a cover and the second part is a housing of the device.

8. A hinge mechanism according to claim 7, wherein the first part is an inlay on the cover.

9. A hinge mechanism suitable for hinging a first part of a device to a second part of the device wherein the first part can be tilted between an open position and a closed position in relation to the second part, the hinge mechanism comprising:

a pair of pins attached to the first part and arranged along a pivoting axis;

a pair of apertures on the second part of the device for receiving the pins to hinge the first part to the second part, wherein each aperture defines a first aperture portion and a second constricted aperture portion;

a pivoting point along the confines of the guide, on one of the first and the second part of the device; and a cam-profiled section on the other of the first part and the second part for interacting with the pivoting point to urge the pin into the second constricted aperture portion for securing the first part in the open position when the first part is tilted from the closed position to the open position.

10. A hinge mechanism according to claim 9, further including a notch along the cam-profiled section for latching onto the pivoting point when the first part is in the open position.

11. A hinge mechanism according to claim 10, further including at least one contoured portion along an aperture wall between the first aperture portion and the second constricted aperture portion for restricting the movement of the corresponding pin between the two aperture portions.

\* \* \* \* \*